US009785514B1

(12) United States Patent
Ranade et al.

(10) Patent No.: US 9,785,514 B1
(45) Date of Patent: *Oct. 10, 2017

(54) TECHNIQUES FOR FILE SYSTEM RECOVERY

(75) Inventors: Dilip Ranade, Kothrud (IN); Aalop Shah, Pune (IN); Nagaprabhanjan Bellari, Pune (IN); Mukund Agrawal, Pune (IN)

(73) Assignee: Veritas Technologies LLC, Mountain View, CA (US)

( * ) Notice: Subject to any disclaimer, the term of this patent is extended or adjusted under 35 U.S.C. 154(b) by 721 days.

This patent is subject to a terminal disclaimer.

(21) Appl. No.: 12/888,178

(22) Filed: Sep. 22, 2010

Related U.S. Application Data

(63) Continuation of application No. 11/864,028, filed on Sep. 28, 2007, now Pat. No. 7,853,571.

(51) Int. Cl.
*G06F 7/00* (2006.01)
*G06F 11/14* (2006.01)
*G06F 17/00* (2006.01)

(52) U.S. Cl.
CPC ...... *G06F 11/1458* (2013.01); *G06F 11/1471* (2013.01); *G06F 11/1474* (2013.01)

(58) Field of Classification Search
CPC ............. G06F 11/1471; G06F 11/1458; G06F 11/1474
USPC ................... 707/683, 999.001–999.005, 682
See application file for complete search history.

(56) References Cited

U.S. PATENT DOCUMENTS

| 5,781,912 | A | * | 7/1998 | Demers ............... G06F 11/1474 707/634 |
| 2001/0034762 | A1 | * | 10/2001 | Jacobs et al. ................. 709/204 |
| 2002/0095403 | A1 | * | 7/2002 | Chandrasekaran et al. ...... 707/1 |
| 2002/0161955 | A1 | * | 10/2002 | Beukema et al. ............ 710/200 |
| 2004/0030703 | A1 | * | 2/2004 | Bourbonnais ..... G06F 17/30377 |
| 2004/0078658 | A1 | * | 4/2004 | Park et al. ...................... 714/16 |
| 2004/0225659 | A1 | | 11/2004 | O'Brien et al. |
| 2005/0223267 | A1 | * | 10/2005 | Fujibayashi ...................... 714/6 |
| 2005/0283504 | A1 | | 12/2005 | Suzuki et al. |
| 2006/0101081 | A1 | | 5/2006 | Lin et al. |
| 2006/0167955 | A1 | * | 7/2006 | Vertes ........................... 707/201 |
| 2007/0014536 | A1 | * | 1/2007 | Hellman ......................... 386/94 |
| 2007/0174354 | A1 | * | 7/2007 | Kodama et al. ............. 707/202 |
| 2008/0046667 | A1 | * | 2/2008 | Fachan et al. ................ 711/154 |

OTHER PUBLICATIONS

R. Jiménez-Peris, M. Patiño-Martínez, G. Alonso, Non-Intrusive, Parallel Recovery of Replicated Data, Proceedings of the 21st IEEE Symposium on Reliable Distributed Systems (SRDS'02), p. 150, Oct. 13-16, 2002.*

* cited by examiner

*Primary Examiner* — Kannan Shanmugasundaram
(74) *Attorney, Agent, or Firm* — Wilmer Cutler Pickering Hale and Dorr LLP

(57) ABSTRACT

Techniques for file system recovery are disclosed. In one particular exemplary embodiment, the techniques may be realized as a method for file system recovery comprising starting a recovery process for a failed node, utilizing the recovery process to read one or more committed but unapplied transactions from storage associated with the failed node, and recreating the one or more committed but unapplied transactions in memory associated with the recovery process.

17 Claims, 2 Drawing Sheets

TECHNIQUES FOR FILE SYSTEM RECOVERY

CROSS-REFERENCE TO RELATED APPLICATIONS

This patent application is a continuation of U.S. patent application Ser. No. 11/864,028, filed Sep. 28, 2007, which is hereby incorporated by reference herein in its entirety.

FIELD OF THE DISCLOSURE

The present disclosure relates generally to file system recovery and, more particularly, to techniques for file system recovery.

BACKGROUND OF THE DISCLOSURE

Journaling file systems are important to ensure file system consistency in the event of a system crash, power outage or other system disabling incident. Journaling file systems may write pending or committed but un-applied transactions to a log or journal in advance of attempting to write them to an associated file system. These committed but un-applied transactions may be committed, but not committed but not yet applied to the actual file system data and meta-data blocks on disk. Journaling file systems may allow committed but un-applied transactions to be read from a journal or log as part of a recovery process and to be written to disk. This may allow a system to ensure file system integrity in the event of a failure. Committed but un-applied transactions, however, must be read from the log or journal and written to the file system in sequential order to maintain the integrity of the file system. This causes a bottleneck in performance of system recovery in journaling file systems. The performance impact is particularly significant as the size of the file system increases and the number of committed but un-applied transactions rises. For example, in a cluster file system it may be necessary to recover all committed but un-applied transactions from a failed node in a cluster and write them to disk prior to resetting the state of distributed locks related to the failed node. This may require a cluster file system to sequentially replay all committed but un-applied transactions of a failed node from a journal or log associated with the failed node and to write these transactions to disk prior to beginning a next step in a recovery process. The delay in recovering a cluster file system may thus be significant.

In view of the foregoing, it may be understood that there are significant problems and shortcomings associated with current methods of recovering journaling file systems.

SUMMARY OF THE DISCLOSURE

Techniques for file system recovery are disclosed. In one particular exemplary embodiment, the techniques may be realized as a method for file system recovery comprising starting a recovery process for a failed node, utilizing the recovery process to read one or more committed but un-applied transactions from storage associated with the failed node, and recreating the one or more committed but un-applied transactions in memory associated with the recovery process.

In another particular exemplary embodiment, the techniques may be realized as an article of manufacture for file system recovery, the article of manufacture comprising at least one processor readable medium, and instructions carried on the at least one medium, wherein the instructions are configured to be readable from the at least one medium by at least one processor and thereby cause the at least one processor to operate so as to start a recovery process for a failed node, utilize the recovery process to read one or more committed but un-applied transactions from storage associated with the failed node, and recreate the one or more committed but un-applied transactions in memory associated with the recovery process.

In a further particular exemplary embodiment, the techniques may be realized as a system for file system recovery comprising one or more processors communicatively coupled to a network node, wherein the network node is configured to start a recovery process for a failed node, utilize the recovery process to read one or more committed but un-applied transactions from storage associated with the failed node, and recreate the one or more committed but un-applied transactions in memory associated with the recovery process.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
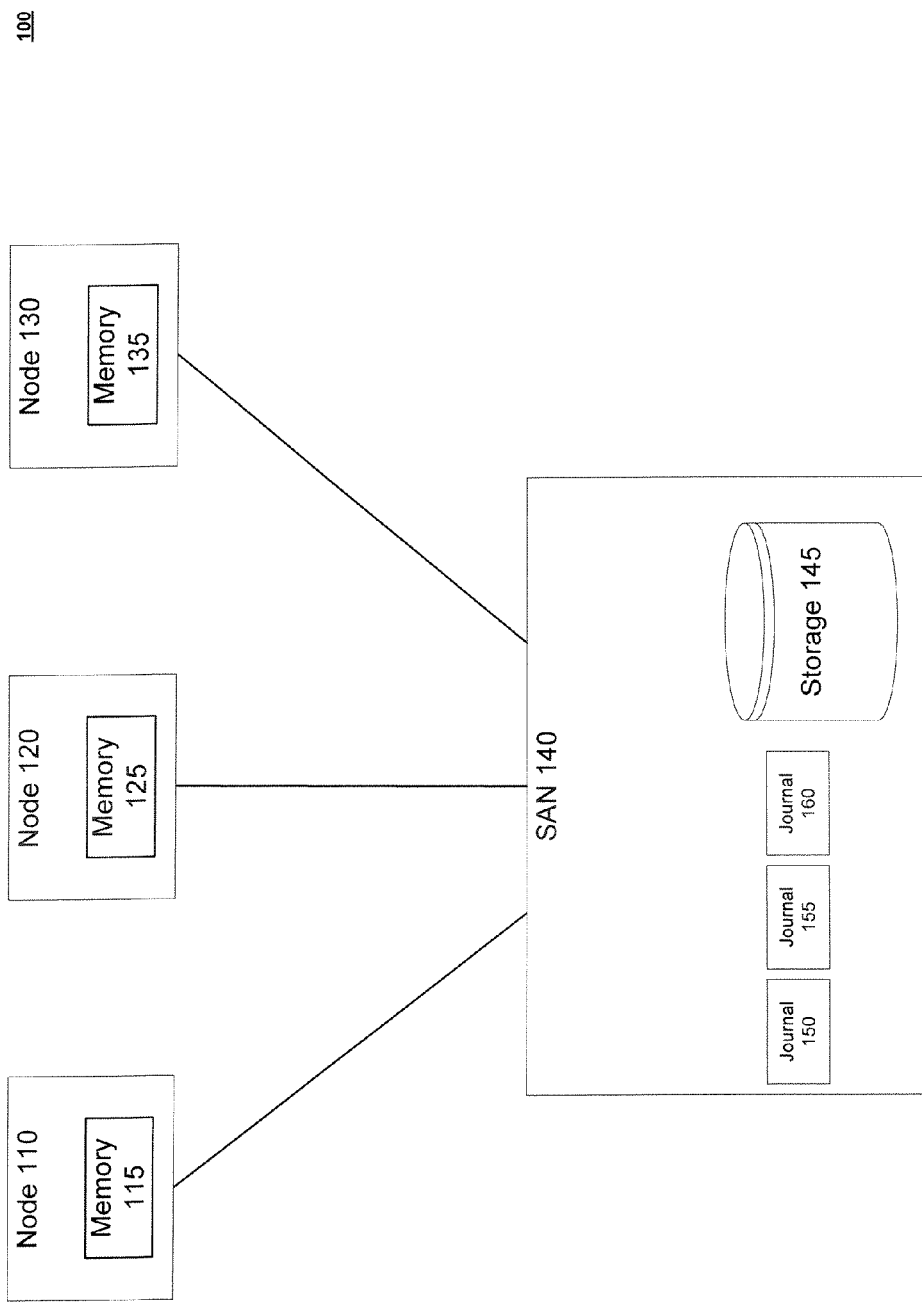
FIG. 1 shows a system for fast recovery of a journaling file system in accordance with an embodiment of the present disclosure.

Referring to FIG. 1, there is shown a system 100 for recovery of a journaling file system in accordance with an embodiment of the present disclosure. Nodes 110, 120 and 130 may represent servers or other computers containing memory 115, memory 125, and memory 135, respectively. Nodes 110, 120 and 130 may be communicatively coupled to a storage area network, SAN 140. Nodes 110, 120 and 130 may utilize storage on SAN 140, such as storage 145. Nodes 110, 120 and 130 may utilize a journaling file system and may store one or more logs or journals on SAN 140. Journals 150, 155 and 160 may represent journals or log files used to record in-flight, pending, or committed but un-applied transactions which are committed but not yet completed by the file system. Storage 145 may represent storage on SAN 140 for a file system, such as a clustered file system. Completed transactions may be written to disk associated with storage 145.

Nodes 110, 120 and 130 may represent servers, hosts platforms or other computing platforms capable of receiving and processing requests to read and write data. In some embodiments, one or more stand-alone nodes which are not part of a clustered file system may utilize local storage, SAN storage or other remote storage. Additionally, in these embodiments nodes may maintain a journal in a non-clustered file system, in local storage, in remote storage, or in SAN storage. In one or more embodiments, nodes 110, 120 and 130 may represent nodes in a clustered file system.

Memory 115, 125 and 135 may represent respective volatile storage of Nodes 110, 120 and 130. Memory 115, 125 and 135 may be random access memory (RAM), or other volatile, non-disk memory that may be utilized for storing of transactions, in memory data structures such as modes and buffers, and other node process related data and instructions.

Journals 150, 155 and 160 may represent a multiple transaction server model and the allocation of one journal per node in a clustered file system. In some embodiments, there may be a single transaction server and a single journal or a primary journal for the clustered file system. Journals 150, 155 and 160 may also represent individual journals corresponding to stand-alone nodes which are not part of a clustered file system. In one or more embodiments hosts may utilize SAN 140 for journal storage and may not be part of a clustered file system.

Journals 150, 155 and 160 may be stored in a specifically allocated area of SAN 140 and may be separate from the file system. Journals 150, 155 and 160 may be accessible to one or more recovery processes and may store information about one or more committed but un-applied transactions for their respective hosts, nodes or servers.

Storage 145 may represent a storage for completed transactions of a clustered file system. Storage 145 may utilize a distributed locking system that may enable multiple nodes to utilize the same file system which may be located on storage 145. Storage 145 may even enable multiple nodes to access the same file. In one or more embodiments, storage 145 may contain partitions, such as logical partitions and may enable nodes, such as stand-alone nodes, to maintain separate file systems. In one or more embodiments, SAN 140 may contain separate physical storage allocated independently to each node for its own file system.

SAN 140 may represent, for example, a storage area network (SAN), an Internet small computer systems interface (iSCSI) SAN, a Fibre Channel SAN, a common Internet File System (CIFS) or a network file system (NFS).

Figure 2:
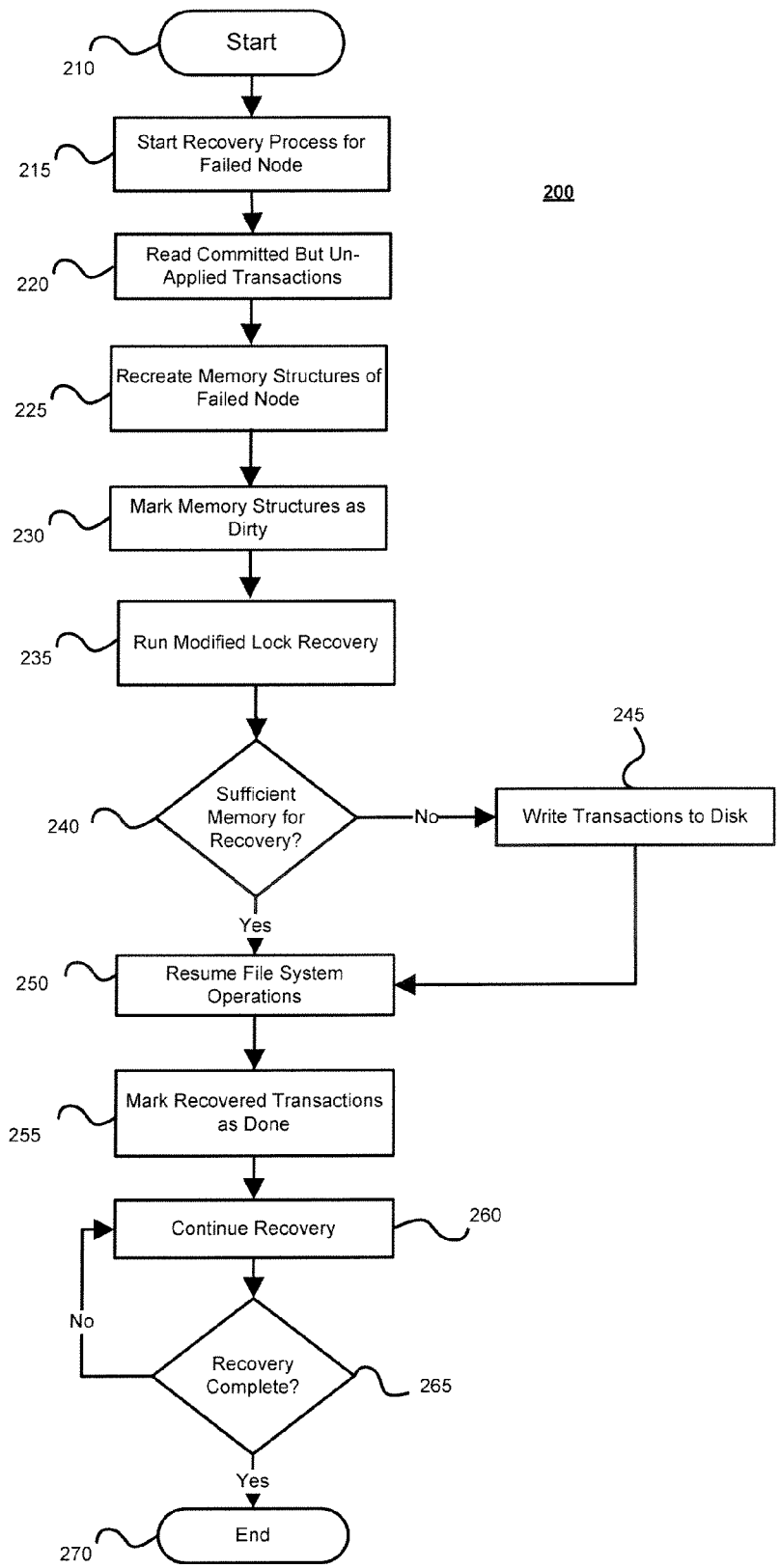
FIG. 2 shows a method for fast recovery of a journaling file system in accordance with an embodiment of the present disclosure.

Referring to FIG. 2, there is shown a method 200 for recovery of a journaling file system in accordance with an embodiment of the present disclosure. The method 200 may start at block 210. At block 215, a node failure may be detected and a recovery coordinator may be elected for one or more failed nodes in a clustered file system. In some embodiments, a node failure may occur in a stand-alone node including a node that may not be connected to a SAN. A stand-alone node may utilize a recovery process that may function similar to or the equivalent of a recovery coordinator. For example, if node 110 were part of a clustered file system with nodes 120 and 130, node 120 may be elected recovery coordinator if node 110 failed. In another embodiment, if node 130 was not part of a clustered file system and it failed, a process may be started on node 130 to begin its own file system recovery.

At block 220, once a recovery coordinator has been elected or a recovery process started, it may begin reading committed but un-applied transactions of a failed node from one or more journals or logs. Transactions may be read and/or replayed sequentially. In the event of a failure during the reading or the processing of the transactions, logs are idempotent (i.e., they may be read or replayed multiple times). For example, node 120, acting as recovery coordinator for failed node 110, may read one or more transactions from journal 150 which may correspond to a journal utilized by node 110. Once a transaction is read it may be recreated in memory.

At block 225, one or more transactions may be recreated in memory of a recovery coordinator, of a secondary node, of a failed stand-alone node, or of a processing platform capable of processing committed but un-applied or dirty transactions. In one or more embodiments, transactions may be recreated in memory by a modified version of a journal or log replay process. The log replay process may be a portion of a modified file system consistency check (fsck) process. The log replay process may utilize an input/output control (ioctl) interface to the file system which may enable a recovery coordinator or a recovery process to receive transactions read from or replayed from a log or journal. Transactions may also be recreated in memory by utilizing an operating system which may accommodate replaying a log or journal in kernel or operating system core processes. This may enable an operating system to replay log or journal transactions into memory prior to mounting the file system and without writing transactions to disk or other non-volatile storage. For example, one or more transactions from journal 150 may be recreated in memory 125 of node 120. Additionally, transactions replayed from a log or journal may be recreated in the memory of a recovery coordinator, a secondary node, the failed node itself, or of a processing platform capable of processing committed but un-applied or dirty transactions by writing the transaction to disk or other storage. A recovery process running on failed node 110 may recreate transactions from journal 150 in memory 115. Transactions recreated in memory may be recreated as inodes, buffers or other memory structures that may enable the processing of the transactions. Once one or more replayed transactions are recreated in memory, the transactions may be further processed at block 230.

At block 230, the in-memory transactions may be marked as dirty, not yet written to disk or committed but un-applied. Additionally, recreated in-memory transactions on a recovery coordinator may contain a flag, state or other indicator which may point or reference a log from which the transaction was replayed. For example, in normal operation, transactions in memory 125 of node 120 may refer to a journal which may be utilized by node 120, such as journal 155. However, if node 120 is acting as a recovery coordinator for node 110, memory 125 may contain one or more transactions replayed from journal 150 which may be the journal associated with node 110. The one or more transactions may contain a flag, state or other indicator pointing or referencing journal 150. In the event of failure of a recovery coordinator, associations of one or more transactions in memory with a journal from which the transaction was replayed may enable a second recovery coordinator or a second recovery process to recover the first failed node and/or a failed recovery coordinator. Once one or more transactions from a journal of a failed node are recreated in memory, if the file system being recovered is a clustered file system, the method 200 may continue at block 235. If the file system being recovered is not a clustered file system the method may continue at block 240.

At block 235, for clustered file systems a modified lock recovery process may be run. The lock recovery process may transfer ownership of one or more locks associated with data related to pending transactions of a failed node to a recovery coordinator for the node, or a secondary node which contains one or more of the failed nodes' replayed transactions. In one or more embodiments utilizing a clustered file system, the lock recovery process may handle the transfer of ownership of distributed locks.

At block 240, the method 200 may verify that a recovery coordinator or a recovery process has sufficient memory to continue recreating one or more transactions of a failed node in memory. If the recovery coordinator or recovery process has a memory utilization beyond a specified threshold, the method 200 may continue at block 245. If the recovery coordinator or recovery process has a memory utilization at or below a specified threshold, the method 200 may continue at block 250. Other factors may be utilized in determining the memory status of a recovery coordinator or recovery process and its need to write one or more transactions to disk. For example, if node 120 is acting as a recovery coordinator for node 110, node 120 may write one or more recreated transactions from memory 125 to storage 145 if memory 125 is more than seventy-five percent full, if node 120 is experiencing delays in reading from a journal, or if other specified recovery conditions occur. In some embodiments, recovery coordinator memory or recovery process memory may not be monitored. In one or more embodiments, a recovery coordinator or a recovery process may monitor memory during one or more portions of the recovery method and may complete one or more transactions to free memory as needed. This may occur during reading or replay of journal transactions, during recreation of journal transactions in memory, during running of a modified lock recovery process, or during other portions of the recovery method.

At block 245, the method 200 may write one or more transactions to non-volatile storage. This may enable one or more transactions in memory to be marked as done in a corresponding journal and flushed or removed from memory. Once memory has been freed by completing one or more transactions, the recovery process may continue.

At block 250, once the lock recovery process has completed, and committed but un-applied transactions have been recreated in memory the file system may resume operations and recovery may proceed in parallel. For example, if node 120 is acting as a recovery coordinator for node 110 after a failure of node 110, once the transactions for node 110 have been recreated from journal 150 into memory 125 and lock ownership has been transferred from node 110 to node 120, the file system may resume normal operations. In parallel, node 120, acting as a recovery coordinator, may continue to recover failed node 110. This may enable a journaling file system to resume operations prior to one or more committed but un-applied transactions being written to disk.

At block 255, when a transaction is written to disk by a recovery coordinator or a recovery process, it may be marked as done or marked with another indicator signifying that the transaction has completed. Once the writing of one or more committed but un-applied or dirty transactions in memory to disk is completed for all or a portion of the committed but un-applied transactions in memory of a recovery coordinator or recovery process, the log or a portion of the log may be cleared.

At block 260, the recovery coordinator or recovery process may continue recovery once all or a portion of the transactions contained in a journal of a failed node have been completed and locks have been released.

At block 265, the method 200 may verify whether recovery has completed. If recovery has not completed, the method 200 may continue at block 260. If recovery has completed, at block 270, the method 200 may end.

If a recovery coordinator fails in the process of recovery, a second recovery coordinator may be elected. The second recovery coordinator may recover committed but un-applied transactions from one or more journals associated with the first failed node and/or the failed recovery coordinator. The second recovery coordinator may ensure that transactions are recreated in memory and may ensure that all committed but un-applied transaction are replayed in the correct temporal order. The second recovery coordinator may also utilize the above described procedures to recreate transactions of a failed node as well as the recovery coordinator in memory, and to transfer ownership of locks to a second recovery coordinator from the failed node and/or the first recovery coordinator. Once this is completed, the file system may resume normal operations and the second recovery coordinator may continue recovery processes in parallel.

At this point it should be noted that a file system recovery technique in accordance with the present disclosure as described above typically involves the processing of input data and the generation of output data to some extent. This input data processing and output data generation may be implemented in hardware or software. For example, specific electronic components may be employed in a recovery coordinating node or similar or related circuitry for implementing the functions associated with a file system recovery technique in accordance with the present disclosure as described above. Alternatively, one or more processors operating in accordance with stored instructions may implement the functions associated with a recovery coordinator in accordance with the present disclosure as described above. If such is the case, it is within the scope of the present disclosure that such instructions may be stored on one or more processor readable carriers (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for file system recovery comprising
   starting a recovery process for a file system associated with a failed node;
   utilizing the recovery process to read one or more committed but un-applied transactions from storage associated with the failed node;
   recreating the one or more committed but un-applied transactions in memory associated with the recovery process, wherein the one or more committed but unapplied transactions are recreated by a modified version of a journal or log replay process, wherein the one or more committed but un-applied transactions are written to at least one of inodes in the memory associated with the recovery process and buffers in the memory associated with the recovery process, and wherein the memory is monitored during the recreating to determine whether there is sufficient memory to continue recreating the one or more committed but un-applied transactions in the memory;

after the one or more committed but un-applied transactions are recreated in the memory associated with the recovery process, associating the recreated transactions with at least one identifier identifying the storage associated with the failed node;

resuming file system operations, wherein the recovery process applies the one or more committed but unapplied transactions to the file system in parallel with resumed file system operations; and marking the one or more committed but un-applied transactions as completed after being written to the file system.

2. The method of claim 1, wherein the failed node is a standalone node, and the recovery process is executed utilizing the failed node.

3. The method of claim 1, wherein the failed node is a node in a clustered file system, and the recovery process is implemented by a recovery coordinator.

4. The method of claim 3, further comprising:
associating the one or more committed but un-applied transactions in the memory associated with the recovery process with the storage associated with the failed node; and
running a lock recovery process on the storage associated with the failed node, wherein the lock recovery process transfers lock ownership of the one or more committed but unapplied transactions of the failed node to the recovery process.

5. The method of claim 3, wherein once the one or more committed but un-applied transactions of the failed node are recreated in the memory associated with the recovery process and lock ownership of the one or more committed but un-applied transactions is transferred to the recovery process, the file system may resume operations and remaining recovery activity may be processed by the recovery process in parallel.

6. The method of claim 1, wherein recreating the one or more committed but un-applied transactions in the memory associated with the recovery process is performed at least in part by a modified file system consistency check process.

7. The method of claim 1, wherein an input/output control is utilized to write the one or more committed but un-applied transactions to the memory associated with the recovery process.

8. The method of claim 1, wherein log replay for the file system recovery is conducted in operating system kernel processes enabling the one or more committed but un-applied transactions to be written to the memory associated with the recovery process.

9. The method of claim 1, wherein the storage associated with the failed node comprises at least one of: a journal and a log.

10. The method of claim 1, further comprising:
writing one or more committed but un-applied transactions to storage associated with the recovery process when memory utilization of the recovery process exceeds a specified predetermined threshold; and
resuming recovery of the failed node.

11. The method of claim 3 further comprising:
detecting a failure of the recovery coordinator;
specifying a second recovery coordinator;
utilizing the second recovery coordinator to read one or more committed but un-applied transactions from the storage associated with the failed node and the recovery coordinator;
recreating the one or more committed but un-applied transactions coordinator;
in memory associated with a second recovery associating the one or more committed but un-applied transactions in the memory of the second recovery coordinator with the storage associated with the failed node and the recovery coordinator; and
running a lock recovery process on the storage associated with the failed node and the recovery coordinator, wherein the lock recovery process transfers lock ownership of the one or more committed but un-applied transactions of the failed node and the recovery coordinator to the second recovery coordinator.

12. An article of manufacture for file system recovery, the article of manufacture comprising:
at least one non-transitory processor readable storage medium; and
instructions carried on the at least one storage medium;
wherein the instructions are configured to be readable from the at least one storage medium by at least one processor and thereby cause the at least one processor to operate so as to:
start a recovery process for a file system associated with a failed node;
utilize the recovery process to read one or more committed but un-applied transactions from storage associated with the failed node;
recreate the one or more committed but un-applied transactions in memory associated with the recovery process, wherein the one or more committed but un-applied transactions are recreated by a modified version of a journal or log replay process, wherein the one or more committed but un-applied transactions are written to at least one of inodes in the memory associated with the recovery process and buffers in the memory associated with the recovery process, and wherein the memory is monitored during the recreating to determine whether there is sufficient memory to continue recreating the one or more committed but un-applied transactions in the memory;
after the one or more committed but un-applied transactions are recreated in the memory associated with the recovery process, associate the recreated transactions with at least one identifier identifying the storage associated with the failed node;
resume file system operations, wherein the recovery process applies the one or more committed but unapplied transactions to the file system in parallel with resumed file system operations; and
mark the one or more committed but un-applied transactions as completed after being written to the file system.

13. A system for file system recovery comprising:
one or more processors communicatively coupled to a network node, wherein the network node is configured to:
start a recovery process for a file system associated with a failed node;

utilize the recovery process to read one or more committed but un-applied transactions from storage associated with the failed node;

recreate the one or more committed but un-applied transactions in memory associated with the recovery process, wherein the one or more committed but un-applied transactions are recreated by a modified version of a journal or log replay process, and wherein the one or more committed but un-applied transactions are written to at least one of inodes in the memory associated with the recovery process and buffers in the memory associated with the recovery process, and wherein the memory is monitored during the recreating to determine whether there is sufficient memory to continue recreating the one or more committed but un-applied transactions in the memory;

after the one or more committed but un-applied transactions are recreated in the memory associated with the recovery process, associate the recreated transactions with at least one identifier identifying the storage associated with the failed node;

resume file system operations, wherein the recovery process applies the one or more committed but unapplied transactions to the file system in parallel with resumed file system operations; and mark the one or more committed but un-applied transactions as completed after being written to the file system.

14. The method of claim 13, wherein the failed node is a standalone node, and the recovery process is executed utilizing the failed node.

15. The system of claim 13, wherein the failed node is a node in a clustered file system, and the recovery process is implemented by a recovery coordinator.

16. The system of claim 15 wherein the network node is further configured to:

associate the one or more committed but un-applied transactions in the memory associated with recovery process with the storage associated with the failed node; and run a lock recovery process on the storage associated with the failed node, wherein the lock recovery process transfers lock ownership of the one or more committed but un-applied transactions of the failed node to the recovery process.

17. The system of claim 15, wherein once the one or more committed but un-applied transactions of the failed node are recreated in the memory associated with the recovery coordinator and lock ownership of the one or more committed but un-applied transactions is transferred to the recovery coordinator, the file system may resume operations and remaining recovery activity may be processed by the recovery coordinator in parallel.

* * * * *